United States Patent [19]

Haruki

[11] Patent Number: 5,757,429
[45] Date of Patent: May 26, 1998

[54] AUTOMATIC FOCUSING APPARATUS WHICH ADJUSTS THE SPEED OF FOCUSING BASED ON A CHANGE IN THE RATE OF THE FOCUS EVALUATING VALUE

[75] Inventor: Toshinobu Haruki, Shijonawate, Japan

[73] Assignee: Sanyo Electric Co., Ltd., Osaka, Japan

[21] Appl. No.: 260,768

[22] Filed: Jun. 16, 1994

[30] Foreign Application Priority Data

Jun. 17, 1993 [JP] Japan ................................. 5-146286
Jun. 24, 1993 [JP] Japan ................................. 5-153663

[51] Int. Cl.⁶ .................................................. G03B 13/00
[52] U.S. Cl. .................................... 348/354; 348/356
[58] Field of Search ............................. 348/345, 347, 348/349, 354, 355, 356; H04N 5/232

[56] References Cited

U.S. PATENT DOCUMENTS

| | | |
|---|---|---|
| 4,531,158 | 7/1985 | Murakami et al. . |
| 4,762,986 | 8/1988 | Suda et al. . |
| 4,841,370 | 6/1989 | Murashima et al. . |
| 4,853,789 | 8/1989 | Murashima et al. . |
| 4,920,369 | 4/1990 | Kaneda et al. . |
| 4,920,420 | 4/1990 | Sano et al. . |
| 4,922,346 | 5/1990 | Hidaka et al. . |
| 5,003,339 | 3/1991 | Kikuchi et al. . |
| 5,005,086 | 4/1991 | Iwamoto et al. ................... 354/404 |
| 5,164,756 | 11/1992 | Hirasawa ............................ 348/345 |
| 5,200,828 | 4/1993 | Jang et al. . |
| 5,249,058 | 9/1993 | Murata et al. . |
| 5,287,223 | 2/1994 | Hirasawa ............................ 348/345 |

FOREIGN PATENT DOCUMENTS

| | | |
|---|---|---|
| 0297587 | 1/1989 | European Pat. Off. . |
| 0331502 | 9/1989 | European Pat. Off. . |
| 0419179 | 3/1991 | European Pat. Off. . |
| 2093509 | 4/1990 | Japan . |

*Primary Examiner*—Andrew Faile
*Assistant Examiner*—Tuan V. Ho
*Attorney, Agent, or Firm*—Michaelson & Wallace; Peter L. Michaelson

[57] ABSTRACT

An automatic focusing apparatus includes a circuit to generate a focus evaluating value; a control unit for moving a focusing lens position so that the focus evaluating value attains the maximum value; four memories for respectively storing four successive focus evaluating values; and four memories for storing four position data of the focusing lens corresponding to the focus evaluating values. The automatic focusing apparatus further includes a circuit for calculating an amount of change of the focus evaluating value based on the focus evaluating values of the current and second last fields, a circuit for calculating an amount of change of the lens position corresponding thereto, and a circuit for calculating the rate of change of the focus evaluating value based on these amounts of change.

4 Claims, 8 Drawing Sheets

AUTOMATIC FOCUSING APPARATUS WHICH ADJUSTS THE SPEED OF FOCUSING BASED ON A CHANGE IN THE RATE OF THE FOCUS EVALUATING VALUE

BACKGROUND OF THE INVENTION

1. Field of the Invention

The present invention relates generally to an automatic focusing apparatus, and more particularly, to an improvement of an automatic focusing apparatus for automatically matching the focus relative to an object in response to a video signal obtained from an image sensor, in an image sensing apparatus such as a video camera having an automatic focusing mechanism.

2. Description of the Background Art

Conventionally, in an automatic focusing apparatus used in an image sensoring apparatus such as a video camera, an approach utilizing a video signal itself obtained from an image sensor for evaluating the state of focus control has been developed. According to such an approach, a lot of good characteristics can be obtained. For example, there exists substantially no parallax. In addition, even if the depth of field is small and an object is located in the distance, the focus can be exactly matched. Furthermore, according to this approach, a specific sensor for automatic focusing need not be separately provided, so that the apparatus has a very simple mechanism.

A control method known as a hill-climbing servo system is one example of such a conventional focus control method utilizing a video signal. The hill climbing servo system is described, for example, in U.S. Pat. Nos. 4,922,346 and 5,003,339. Briefly stated, a high frequency component of a video signal is detected every one field as a focus evaluating value, the focus evaluating value is always compared with a focus evaluating value detected one field before, and the position of a focusing lens is continuously slightly vibrated such that the focus evaluating value always takes the maximum value.

In the above described hill-climbing servo system, if only the slope of a focus evaluating value is detected, the focusing lens is not stopped in a defocused position by always driving the focussing lens in the direction of increasing the focus evaluating value, even if the object is changed, so that very good follow-up characteristics with respect to the object can be achieved.

FIG. 6 is a block diagram showing the whole structure of the hill-climbing servo system automatic focusing apparatus and FIG. 7 is a block diagram showing details of the focus evaluating value generating circuit of FIG. 6.

Referring to FIG. 6, the video camera includes a focusing ring 2 for moving forward and backward the focusing lens 1, a focusing motor 3 for driving focus ring 2, an iris mechanism 21 for adjusting exposure, and an image sensor circuit 4 including an image sensor (not shown) such as a CCD.

An image formed on a surface of the image sensor by focusing lens 1 is converted into a video signal by image sensing circuit 4, and applied to a focus evaluating value generating circuit 5. Referring to FIG. 7 which shows details of focus evaluating value generating circuit 5, a luminance signal component in the video signal applied from image sensing circuit 4 is applied to a synchronous separator 5a and to a highpass filter (HPF) 5c. When the luminance signal passes through highpass filter 5c, only the high frequency component is separated from the luminance signal, and is applied to a detector 5d. The high frequency component of the luminance signal is amplitude-detected by detector 5d, and the detected output is sampled and successively converted to a digital value by an A/D converter 5e.

Meanwhile, synchronous separator 5a separates a vertical synchronizing signal and a horizontal synchronizing signal from the applied luminance signal, and applies these to a gate control circuit 5b. Gate control circuit 5b sets a rectangular focusing area in a central portion of a picture in response to the applied vertical and horizontal synchronizing signals and to a fixed output of an oscillator (not shown). Gate control circuit 5b applies a signal for opening or closing a gate every field to gate circuit 5f such that passage of the high frequency component of the luminance signal which has been digitized is permitted only in the range of the focusing area. Gate circuit 5f may be provided anywhere before an integration circuit 5g, which will be described later.

Only the detected output corresponding to the focusing area is applied every field to integration circuit 5g by gate circuit 5f. Integration circuit 5g integrates the applied detected output field by field, and provides the result as a focus evaluating value (FEV) of the current field. In other words, in integration circuit 5g, digital integration, in which A/D converted outputs of the focusing area obtained in 1 field period are all added, is performed.

Focus evaluating value generating circuit 5 structured as described above constantly outputs the focus evaluating value of 1 field, and circuits in the succeeding stage start focusing operation by utilizing the focus evaluating value.

FIG. 8 is a graph showing the relation between the focus evaluating value and the lens position (distance between the lens and the object, that is, object distance) in the automatic focusing apparatus shown in FIG. 6. In FIG. 8, the abscissa represents the position of the focusing lens, and the ordinate represents the focus evaluating value.

Referring to FIGS. 6 and 8, immediately after an automatic focusing operation is started, the focus evaluating value corresponding to the first one field supplied from the focus evaluating value generating circuit 5 is applied to a maximum value memory 6 and an initial value memory 7 and held therein. Thereafter, a focusing motor control circuit 10 controls a focusing motor driving circuit 31 such that focusing motor 3 rotates in a prescribed direction. Then, a comparator 9 compares the initial focus evaluating value held in the initial value memory 7 and the current focus evaluating value provided from focus evaluating value generating circuit 5, and provides a comparison signal. Focusing motor control circuit 10 initializes direction of rotation of focusing motor 3 in response to the comparison signal.

More specifically, focusing motor control circuit 10 rotates focusing motor 3 in the above described predetermined direction until comparator 9 generates a comparison output of "large" or "small". If a comparison output indicating that the current focusing evaluating value is larger than the initial focus evaluating value held in initial value memory 7 is output from comparator 9, focusing motor control circuit 10 maintains the above mentioned prescribed direction of rotation. If a comparison output indicating that the current focus evaluating value is smaller than the initial focus evaluating value is obtained, focusing motor control circuit 10 reverses the direction of rotation of focusing motor 3.

Thus, initialization of the direction of rotation of focus motor 3 is completed, and from this time on, focusing motor control circuit 10 monitors the output from comparator 8. In order to prevent a malfunction due to noise of the focus evaluating value, comparator 9 is adapted not to generate the comparison output indicating "large" or "small" as long as the difference between the initial focus evaluating value and the current focus evaluating value does not exceed a predetermined threshold value.

Meanwhile, comparator 8 compares the maximum focus evaluating value so far held in maximum value memory 6 and the current focus evaluating value output from focus evaluating value generating circuit 5, and outputs two different comparison signals S1 and S2 indicating a mode (first mode) in which the current focus evaluating value is larger than the focus evaluating value held in maximum value memory 6 and a mode (second mode) in which the current focus evaluating value is decreased by more than a predetermined threshold value M. Here, when the current focus evaluating value is larger than the content of maximum value memory 6, the content of the maximum value memory is updated in response to the output S1 of comparator 8, so that the maximum value of the focus evaluating value so far is always held in the maximum value memory 6.

A motor position detector 30 detects amount of rotation of focusing motor 3, and generates a corresponding lens position signal. The lens position signal indicates the position (lens position) of lens 1 in the direction of the optical axis. The lens position signal is applied to lens position memory 13. Similar to maximum value memory 6, lens position memory 13 is updated such that the lens position signal at which the focus evaluating value attains the maximum is always held, in response to the output S1 from comparator 8.

As described above, focusing motor control circuit 10 monitors the output from comparator 8 while rotating the focusing motor 3 in the initially set direction, in response to the output from comparator 9. When comparison output S2 of the second mode indicating that the current focusing evaluating value decreases from the maximum focus evaluating value by more than the threshold value M is obtained from comparator 8, as shown in FIG. 8, focusing motor control circuit 10 reverses the direction of rotation of focusing motor 3. By this reverse rotation of focusing motor 3, the direction of movement of the lens switches from the direction toward the image sensor to the direction away from the image sensor, or vice versa.

After focusing motor 3 is reversed, a comparator 14 compares the content in lens position memory 13 corresponding to the maximum value of the focusing evaluating value with the current lens position signal supplied from motor position detector 30. When these two match, that is, when lens 1 returns to a position at which focus evaluating value attains the maximum, focusing motor control circuit 10 stops rotation of focusing motor 3. At the same time, focusing motor control circuit 10 provides a lens stop signal LS. In the above described manner, a series of automatic focusing operations are completed.

A memory 11 and a comparator 12 are provided for resuming an automatic focusing operation by focusing motor control circuit 10 if the focus evaluating value changes by more than a predetermined threshold value while the focusing lens is stopped. More specifically, a focus evaluating value at the time point when the automatic focusing operation by focusing motor control circuit 10 is terminated and lens stop signal LS is generated is held in memory 11. Comparator 12 compares the content of memory 11 with the current focus evaluating value supplied from focus evaluating value generating circuit 5, and if the difference therebetween exceeds the predetermined threshold value, it is considered that there has been a change in the object, and a signal indicating the change of object is applied to focusing motor control circuit 10. As a result, automatic focusing operation by focusing motor control circuit 10 is resumed, so that an automatic focusing operation following the change of the object can be achieved.

However, the above described automatic focusing apparatus suffers from the following disadvantageous.

First, since the rotational speed of the focusing motor 3 cannot be increased, it is difficult to achieve a high-speed automatic focusing operation.

Referring to FIG. 8, it is assumed that the automatic focusing operation is started in the state in which the lens is in a position A considerably spaced apart from an in-focus position P on the side of the object. In this case, focusing motor 3 rotates in the direction of increasing the distance between the lens and the object from the position A where the focus evaluating value is small and the object is significantly defocused, so that the focus evaluating value rises rapidly. As the lens reaches the vicinity of point P1, the rise of the focus evaluating value becomes moderate. Then, the lens passes through the in-focus position p and reaches a position P' of the lens where the focus evaluating value drops by more than the aforementioned threshold value M. Thereafter, the lens returns from the lens position P' to the in-focus position P and stops there.

It is required that such a series of automatic focusing operations are performed at high speed. However, when focusing lens 1 is moved at high speed by rotating focusing motor 3 at high speed, the following problem arises.

First, it is inevitable that overrun occurs due to the inertia of the motor itself when the motor is reversed when at the focus lens position P' or the motor is stopped at focus lens position P. The higher the speed of rotation of focusing motor 3 is, the larger the overrun becomes. As a result, the time is made rather longer until the lens reaches the in-focus position.

The conventional automatic focusing system is superior in its focusing precision and response to a wide variety of objects. However, whether the in-focus position P is reached or not is detected by the decrease of focus evaluating value. Unfortunately, since there is inevitably a delay in the focus evaluating value by the period from the time point when the light enters the image sensor until the end of integration in the focus evaluating value generating circuit 5, the focusing lens 1 will pass over the in-focus position principally. Accordingly, if the speed of moving the lens is increased, the amount of overrun of the focusing lens 1 would be significantly large. Therefore, blurring of the picture caused by the overrun is inevitable, particularly when the lens position is actuated at high speeds.

Thus, in the conventional automatic focusing apparatus, the speed of rotation of focusing motor 3 cannot be set very high. Consequently, a high-speed automatic focusing operation cannot be performed.

Furthermore, the conventional automatic focusing apparatus suffers from a disadvantage that the focus evaluating value changes because of interlaced scanning. More specifically, in the above described conventional automatic focusing apparatus, the position of the lens is controlled such that a focus evaluating value obtained from a level of high frequency component of the video signal is always the maximum. However, since the video signal is generally subjected to interlaced scanning, the positions of even and odd fields constituting one picture are shifted in the picture by one scanning line. Consequently, even if the same object is continuously picked up, the focus evaluating value fluctuates with every field, resulting in the disadvantage that the lens position at which the focus evaluating value attains the maximum cannot be definitely determined.

Further, in the above described automatic focusing apparatus, when the object does not change at all, in-focus state can be achieved by the above described focusing operation. However, in actual recording, the object may move forward, backward, left or right and the shape of the object itself may change, so that the focus evaluating value may change because of such movement, not because the movement of focusing lens 1.

If the object changes considerably, the direction of in-focus position P may be erroneously recognized at the initial stage, or comparator 8 may erroneously determine that the focus evaluating value is decreased by more than the predetermined threshold value M before the in-focus position P is reached, resulting in malfunction such as erroneous switching of the mode to the second mode and reverse rotation of focusing motor 3.

Meanwhile, when an iris of iris mechanism 21 adjusting the amount of incident light to the image sensor is opened/closed, the relation between the focus evaluating value and the lens position changes as shown in FIG. 8. In FIG. 8, when the iris of iris mechanism 21 is opened, that is, the F value is made smaller and the amount of incident light is not match intercepted, the focus evaluating value changes as shown by the solid curve of FIG. 8. When the same object is being picked up under the same condition with the iris closed, that is, with the F value increased, the focus evaluating value changes as represented by the dotted curve of FIG. 8. Therefore, the range of the lens position in which the focus evaluating value of a prescribed level can be obtained becomes wider if the iris is closed, and as a result, the depth of field becomes deeper.

If the iris is closed and the depth of field is deep, the curve of the focus evaluating value becomes moderate as can be seen from FIG. 8, and the rate of change of the focus evaluating value with respect to the amount of change of the lens position becomes smaller, resulting in higher possibility of the aforementioned malfunction.

If focus motor 3 is rotated at a high speed so as to make the amount of change of the focus evaluating value per 1 field sufficiently large, such a malfunction can be prevented. However, as described above, the higher the speed of rotation of focusing motor 3, the more overrun.

SUMMARY OF THE INVENTION

Therefore, an object of the present invention is to provide an automatic focusing apparatus allowing a high speed automatic focusing operation.

Another object of the present invention is to provide an automatic focusing apparatus which can reduce overrun of the lens at the in-focus position.

A further object of the present invention is to provide an automatic focusing apparatus which can prevent change in the focus evaluating value derived from interlaced scanning and which allows precise detection of the position of the focusing lens at which the focus evaluating value attains the maximum.

A still further object of the present invention is to provide an automatic focusing apparatus which can suppress malfunctions such as rotation of the focusing motor in the direction reverse to the in-focus direction, even when the iris is almost fully closed.

According to an aspect of the present invention, an automatic focusing apparatus for automatically matching focus with respect to an object in response to a video signal obtained from an image sensing circuit having a lens and an image sensor receiving incident light through the lens includes a focus evaluating value supplying unit, a lens position changing unit, a calculating unit and a speed control unit. The focus evaluating value supplying unit supplies a high frequency component level of the video signal obtained from the image sensing circuit as the focus evaluating value in every first prescribed period. Lens position changing unit changes the relative position of the lens along the direction of the optical axis with respect to the image sensor, so that the focus evaluating value from the focus evaluating value supplying unit attains the maximum. The calculating unit calculates the ratio of the amount of change of the focus evaluating value in a second prescribed time period with respect to the amount of change of the corresponding lens position, and supplies the result as the evaluating value change rate. The speed control unit controls the speed of changing relative lens position by lens position changing unit, in response to the evaluating value change rate from the calculating unit.

In the above described automatic focusing apparatus, preferably, the focus evaluating value supplying unit integrates the high frequency component every field, and supplies the result as the focus evaluating value. The calculating unit calculates the ratio of the amount of change of the focus evaluating value from a certain field and a field succeeding by two with respect to the amount of change of the corresponding relative lens position, and supplies the result as the evaluating value change rate.

In the above described automatic focusing apparatus, preferably, the focus evaluating value supplying unit integrates the high frequency component level every field and supplies the result as the focus evaluating value. The calculating unit calculates the ratio of the amount of change of the focus evaluating value from a certain field to the next field with respect to the amount of change of the corresponding lens position, and supplies the result as the evaluating value change rate.

In accordance with another aspect of the present invention, the automatic focusing apparatus for automatically matching focus with respect to an object in response to a video signal obtained from an image sensing circuit having a lens and an image sensor receiving incident light through the lens, includes a focus evaluating value supplying unit, a lens position changing unit, an iris mechanism and a control unit. The focus evaluating value supplying unit supplies the high frequency component level of the video signal obtained from the image sensing circuit as a focus evaluating value at every first prescribed time period. The lens position changing unit changes the relative position of the lens along the axial direction with respect to the image sensor so that the focus evaluating value from the focus evaluating value supplying unit attains the maximum value. The iris mechanism adjusts the amount of incident light to the image sensor. The control unit controls the speed of change of the relative lens position by the lens position changing unit, in response to the amount of stopping down by the iris mechanism.

Therefore, an advantage of the present invention is that overrun of the lens position in the vicinity of the in-focus position can be suppressed because the speed of movement of the lens decreases when the change rate of the focus evaluating value is decreasing, that is, when the lens is near the in-focus position.

Another advantage of the present invention is that the amount of change of the focus evaluating value per unit time increases as the speed of movement of the lens increases when the iris is much stopped down, whereby malfunction can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
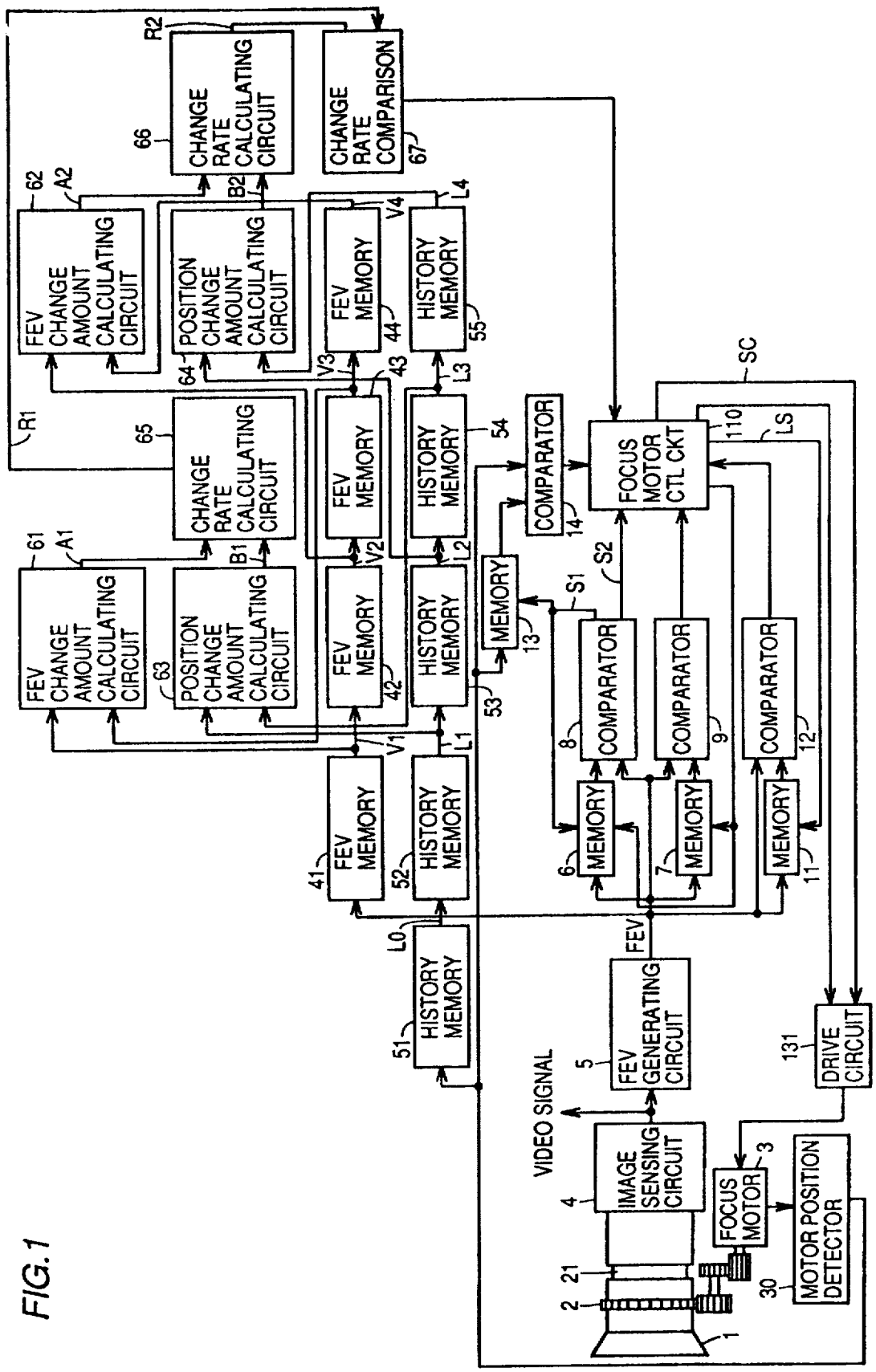
FIG. 1 is a block diagram showing the whole structure of an automatic focusing apparatus in accordance with Embodiment 1 of the present invention.

Embodiments of the present invention will be described in detail with reference to the figures. In the figures, the same reference characters denote the same or corresponding portions.

[Embodiment 1]

FIG. 1 is a block diagram showing the whole structure of the automatic focusing apparatus in accordance with Embodiment 1 of the present invention. Referring to FIG. 1, the automatic focusing apparatus includes a focusing lens 1, a focusing ring 2 for moving focusing lens 1 along the direction of the optical axis, a focusing motor 3 for rotating the focusing ring, and an image sensing circuit 4 including an image sensor such as a CCD (not shown) receiving incident light through focusing lens 1. Between focusing lens 1 and the image sensor, an iris mechanism 21 for adjusting amount of light incident on the image sensor through focusing lens 1 is provided. In response to the incident light, image sensing circuit 4 generates a video signal.

The automatic focusing apparatus further includes a focus evaluating value generating circuit 5 which detects high frequency component level of the video signal obtained from image sensing circuit 4, and integrates the high frequency component level every field to provide the result as a focus evaluating value (FEV). The video signal from the image sensing circuit 4 is also applied to a signal processing circuit (not shown), and the video signal processed therein is recorded on a magnetic tape, for example.

The automatic focusing apparatus further includes a maximum value memory 6, an initial value memory 7, comparators 8 and 9, a motor position detector 30, a lens position memory 13, a comparator 14, a focusing motor control circuit 110 and a focusing motor driving circuit 131. By these components, position of focusing lens 1 is changed, such that the focus evaluating value from focusing evaluating value generating circuit 5 becomes the maximum.

The automatic focusing apparatus further includes a memory 11 and a comparator 12 and by these components, when the object changes after the end of focusing operation, automatic focusing operation by focusing motor control circuit 110 is resumed.

Figure 6:
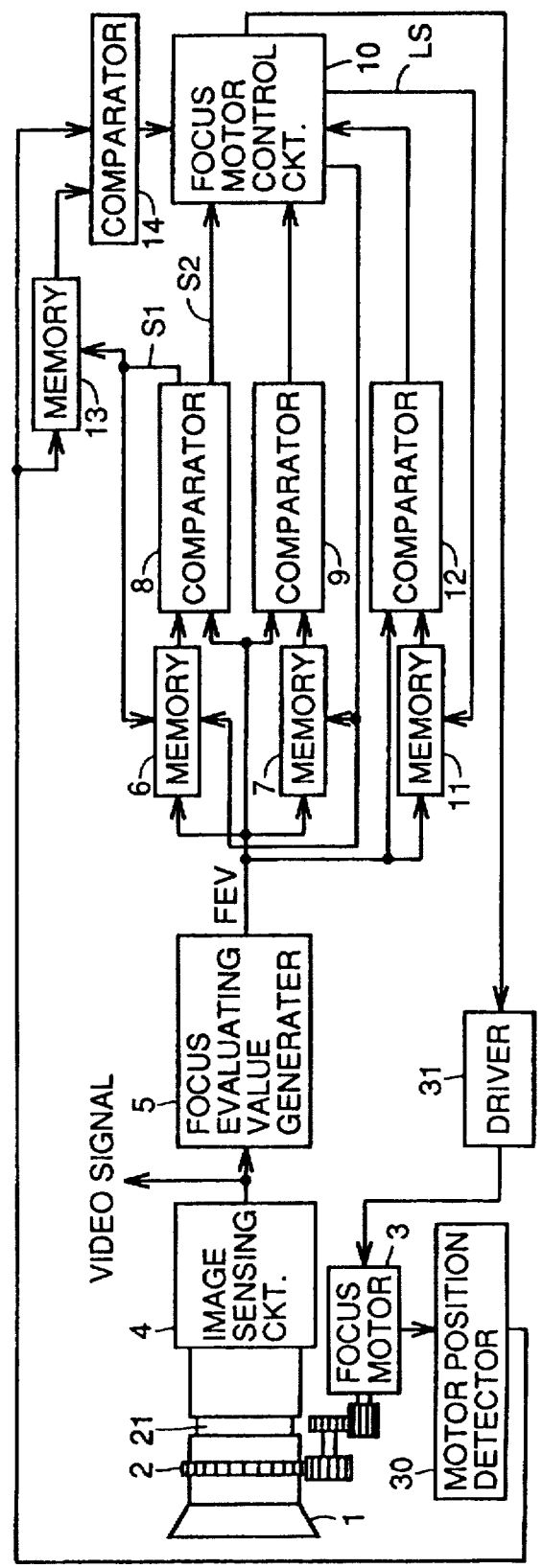
FIG. 6 is a block diagram showing the whole structure of a conventional automatic focusing apparatus.
Figure 7:
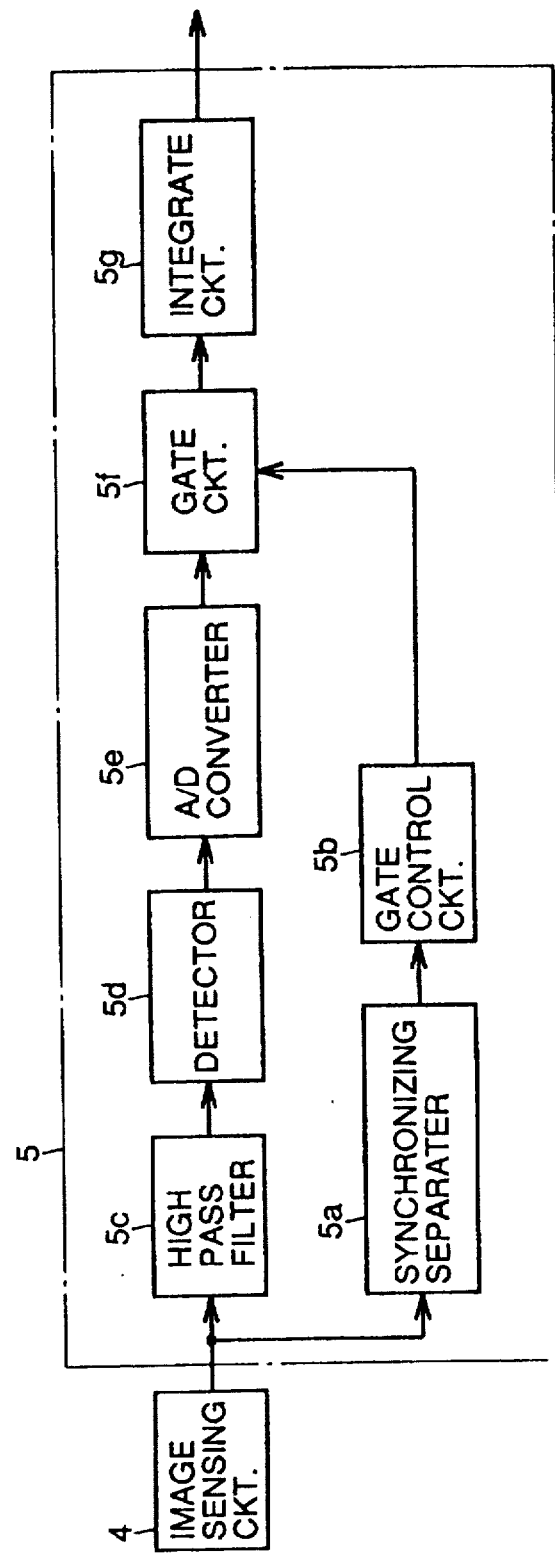
FIG. 7 is a block diagram showing details of a focus evaluating value generating circuit of FIG. 6.

The structures and operation heretofore are approximately the same as those of the conventional automatic focusing apparatus shown in FIG. 6, and therefore detailed description thereof is not repeated. However, focusing motor control circuit 110 and the focusing motor driving circuit 131 are further provided with new functions, which will be described later.

The automatic focusing apparatus further includes four focus evaluating value memories 41 to 44. These four memories 41 to 44 respectively store focus evaluating values of 4 fields continuously supplied from focus evaluating value generating circuit 5.

The automatic focusing apparatus further includes five position history memories 51 to 55. These five memories 51 to 55 respectively store position data of focusing lens 1 in 5 fields continuously supplied from motor position detector 30.

The automatic focusing apparatus further includes an FEV change amount calculating circuit 61, a position change amount calculating circuit 63 and an FEV change rate calculating circuit 65. FEV change amount calculating circuit 61 calculates the amount of change A1 of the focus evaluating value based on the focus evaluating value V1 stored in memory 41 and the focus evaluating value V3 stored in memory 43. Position change amount calculating circuit 63 calculates the amount of change B1 of lens 1 based on position data L1 stored in memory 52 and position data L3 stored in memory 54. Change rate calculating circuit 65 calculates the rate of change R1 of the focus evaluating value based on the amounts of change A1 and B1 from calculating circuits 61 and 63.

The automatic focusing apparatus further includes second FEV change amount calculating circuit 62, second position change amount calculating circuit 64 and a second FEV change rate calculating circuit 66. Second FEV change amount calculating circuit 62 calculates the amount of change A2 of the focus evaluating value based on the focus evaluating value V2 stored in memory 42 and the focus evaluating value V4 stored in memory 44. Second position change amount calculating circuit 64 calculates the amount of change B2 of lens position based on position data L2 stored in memory 53 and position data L4 stored in memory 55. Second change rate calculating circuit 66 calculates the rate of change R2 of focus evaluating value based on the amounts of change A2 and B2 from calculating circuits 62 and 64.

The automatic focusing apparatus further includes a change rate comparing circuit 67 for comparing rates of change R1 and R2 from change rate calculating circuits 65 and 66. Focusing motor control circuit 110 is adapted such that it generates a speed control signal SC in response to the result of comparison from comparing circuit 67 and applies the signal to focusing motor driving circuit 131. Focusing motor driving circuit 131 is adapted to change the speed of rotation of focusing motor 3 in response to the speed control signal SC.

Therefore, as compared with the conventional apparatus, in the automatic focusing apparatus of the present invention, memories 41 to 44 and 51 to 55, calculating circuits 61 to 66 and a comparing circuit 67 are newly added, and the conventional focusing motor control circuit 10 and focusing motor driving circuit 31 are improved.

Operations of the newly provided components will be described.

In Embodiment 1, the focus evaluating value FEV from focus evaluating value generating circuit 5 is applied to comparators 8 and 9 as in the prior art example, and based on the focus evaluating value, the focusing operation is carried out. The focus evaluating value FEV are also successively applied to focus evaluating value memory 41.

When focus evaluating value generating circuit 5 generates a focus evaluating value of a certain field, the focus evaluating value is first stored in memory 41. Thereafter, when focus evaluating value generating circuit 5 generates a focus evaluating value of the next field, the focus evaluating value V1 which has been stored in memory 41 is stored in memory 42, and the new focus evaluating value just generated from focus evaluating value generating circuit 5 is stored in memory 41.

Thereafter, when focus evaluating value generating circuit 5 generates a focus evaluating value of still another field, the focus evaluating value V2 which has been stored in memory 42 is stored in memory 43, and the focus evaluating value V1 which has been stored in memory 41 is stored in memory 42. The new focus evaluating value just generated from focus evaluating value generating circuit 5 is stored in memory 41.

Thereafter, when focus evaluating value generating circuit 5 generates a focus evaluating value of a still another field, the focus evaluating value V3 which has been stored in memory 43 is stored in memory 44, the focus evaluating value V2 which has been stored in memory 42 is stored in memory 43, and the focus evaluating value V1 which has been stored in memory 41 is stored in memory 42. The new focus evaluating value generated from focus evaluating value generating circuit 5 is stored in memory 41.

Consequently, in memory 41, the newest focus evaluating value V1, that is, the focus evaluating value of the current field is always stored in memory 41, the focus evaluating value V2 of one field before is stored in memory 42, the focus evaluating value V3 of two fields before is stored in memory 43, and the focus evaluating value V4 of three fields before is stored in memory 44. In short, in these four memories 41 to 44, focus evaluating values of four fields, that is, from the current field to the third last field are stored respectively.

As described above, the focus evaluating value is generated successively field by field. Between respective fields, focusing lens 1 moves continuously. Accordingly, at an intermediate time point of each exposure time (1 field) of the image sensor, position of focusing motor 3 is detected by motor position detector 30, and the detected position is supplied as a representative lens position of each field to the position history memory 51. Therefore, in memory 51, the newest lens position data L0 is always stored. Data L0 stored in memory 51 is stored as lens position data L1 in position history memory 52 after 1 field. The data L1 stored in memory 52 is stored as lens position data L2 in position history memory 53 after another 1 field. Data L2 stored in memory 53 is stored as lens position data L3 in position history memory 54 after still another 1 field. Data L3 stored in memory 54 is stored as lens position data L4 in position history memory 55 after still another 1 field.

In position history memory 51, the corresponding lens position data is stored at an intermediate time point in each field, while the corresponding focus evaluating value is stored in focus evaluating value memory 41 at the end of each field. This is because the focus evaluating value is an integration of the video signals successively applied every field. When the focus evaluating value is supplied from focus evaluating value generating circuit 5 to focus evaluating value memory 41, the data L0 which has been stored in memory 51 is transferred to memory 52. Therefore, in memory 52, lens position data L1 corresponding to the focus evaluating value V1 stored in memory 41 is stored. In memory 53, lens position data L2 is stored, which corresponds to the focus evaluating value V2 stored in memory 42. In memory 54, lens position data L3 is stored which corresponds to the focus evaluating value V3 stored in memory 43. In memory 55, lens position data L4 is stored which corresponds to the focus evaluating value V4 stored in memory 44. As described above, in these five memories 51 to 55, lens position data L0 to L4 of 5 fields, that is, from the current field to the fourth last field are stored respectively.

Focus evaluating values V1 and V3 stored in memories 41 and 43 are applied to FEV change amount calculating circuit 61, and in calculating circuit 61, difference A1 (=V1–V3) between these focus evaluating values is calculated. The difference A1 corresponds to the amount of change of the focus evaluating value generated in 2 fields, that is, from the second last to the current field. Focus evaluating values V2 and V4 stored in memories 42 and 44 are applied to second FEV change amount calculating circuit 62, and in calculating circuit 62, difference A2 (=V2–V4) of these focus evaluating values is calculated. The difference A2 corresponds to the amount of change of the focus evaluating value generated in 2 fields from three fields before to one field before the current field.

Lens position data L1 and L3 stored in memories 52 and 54 are applied to position change amount calculating circuit 63, and in calculating circuit 63, absolute value B1 (=|L1−L3|) of the difference between these data is calculated. The value B1 corresponds to the distance of movement of lens 1 during 2 fields, that is, the second last to the current field. Lens position data L2 and L4 stored in memories 53 and 55 are applied to second position change amount calculating circuit 64, and in calculating circuit 64, absolute value B2 (=|L2−L4|) of the difference between these data is calculated. The value B2 corresponds to the distance of movement of lens 1 during 2 fields, that is, the third last to the last field.

The amount of change A1 of the focus evaluating value from calculating circuit 61 and the amount of change B1 of position from calculating circuit 63 are both applied to focus change rate calculating circuit 65, and in calculating circuit 65, the ratio A1/B1 of these amounts of change is calculated and applied as change rate R1 of focus evaluating value with respect to the amount of change of lens 1, to change rate comparing circuit 67. The ratio A1/B1 corresponds to the change rate of two fields, that is, from the second last to the current field.

Focus evaluating value change amount A2 from second calculating circuit 62 and position change amount B2 from second calculating circuit 64 are both applied to second focus change rate calculating circuit 66, and in second calculating circuit 66, the ratio A2/B2 of the amounts of change is calculated and the result is applied to change rate comparing circuit 67 as the change rate R2 of the focus evaluating value with respect to the amount of change of the lens 1. The ratio A1/B2 corresponds to the change rate in 2 fields, that is, from three fields before to one field before.

Figure 2:
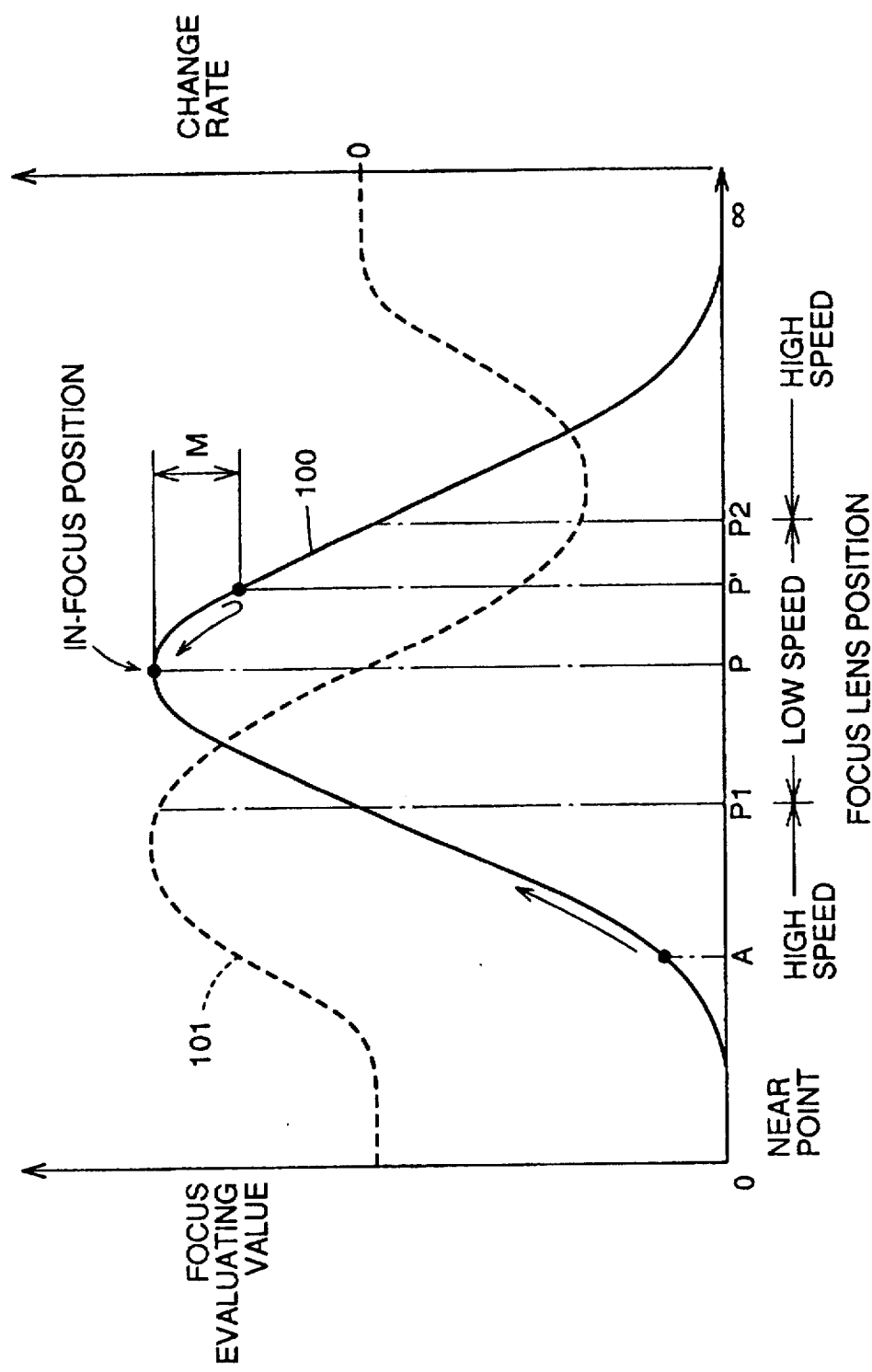
FIG. 2 is a graph showing relation between a focus evaluating value and a position of a focusing lens in the automatic focusing apparatus shown in FIG. 1.

FIG. 2 is a graph showing relation between the focus evaluating value and the position of the focusing lens, and the relation between the change rate of the focus evaluating value and the position of the focusing lens. In the graph, the solid line 100 represents the relation between the focus evaluating value and the position of the focusing lens, and the dotted line 101 represents the relation between the change rate of the focus evaluating value and the position of the focusing lens.

Referring to FIG. 2, the relation between the focus evaluating value and the position of the focusing lens is represented as a curve which assumes the maximum value at the in-focus position P. The relation between the change rate and the focusing lens position is represented as a curve which indicates the differential coefficient of the curve 100 of the focus evaluating value.

It is assumed that at first the focusing lens 1 is at a near point considerably spaced apart to the object side from the in-focus position P. At this time, as it is considerably defocused, the focus evaluating value is nearly 0. From this near point to a point P1, the change rate of the focus evaluating value increases. From this point P1 to the in-focus position P, the change rate of the focus evaluating value decreases. By contrast, when the focusing lens 1 draws near to the in-focus position P from the infinite side, the change rate of the focus evaluating value from the infinite position to a position P2 increases, and from the point P2 to the in-focus position P, the change rate of the focus evaluating value decreases.

As described above, since the change rate of the focus evaluating value decreases as it comes near to the in-focus position P, how close focusing lens 1 is to the in-focus position P can be determined by monitoring the change rate calculated in FEV change rate calculating circuits 65 and 66.

Now, since the video signal is subjected to interlace scanning at present, the positions of scanning lines shift to some extent between the even and odd fields. Consequently, vertical positions in the picture differ slightly in adjacent fields. Namely, the focus evaluating value fluctuates in a period of 2 fields. Therefore, even if the amount of change of the focus evaluating value of 1 field is calculated, accurate rate of change of the focus evaluating value cannot be calculated based on the amount of change.

In Embodiment 1, two change rate calculating circuits 65 and 66 are provided as mentioned above, calculating circuit 65 calculating the change rate between odd fields while calculating circuit 66 calculating change rate of even fields. Therefore, the influence of fluctuation of the focus evaluating value generated in the period of 2 fields can be removed.

Change rates R1 and R2 from change rate calculating circuits 65 an 66 are both applied to change rate comparing circuit 67 in which these rates R1 and R2 are compared with each other. As a result of comparison, when R1≧R2, that is, when the change rate is increasing, an H (High) level comparison output is provided from comparing circuit 67. Meanwhile, if R1<R2, that is, when change rate is decreasing, an L (Low) level comparison output is provided from comparing circuit 67. Similar to the control circuit 10 of FIG. 6, focusing motor control circuit 110 performs hill-climbing focusing operation based on the comparison output from comparators 8, 9 and 14. Moreover, the focusing motor control circuit 110 changes the speed of driving focusing motor 3 based on the comparison output from change rate comparing circuit 67. In other wards, a function of controlling the speed of the focus motor 3 is added to control circuit 110.

If the comparison output from change rate comparing circuit 67 is at the H level, that is, when the change rate is increasing, an H level speed control signal SC is applied to focusing motor driving circuit 131, and in response, focusing motor driving circuit 131 drives focusing motor 3 at high speed. Meanwhile, if the comparison output from change rate comparing circuit 67 is at the L level, that is, when the change range is decreasing, the speed control signal SC changes from the H level to the L level, and the L level speed control signal SC is applied to the focusing motor driving circuit 131. In response, focusing motor driving circuit 131 drives focusing motor 3 at a low speed.

Similar to focusing motor driving circuit 31 of FIG. 6, focusing motor driving circuit 131 drives or stops focusing motor 3 or reverses the direction of rotation of the focusing motor in response to the output from focusing motor control circuit 110 which is based on the output from comparators 8, 9 and 14, and in addition, it switches the speed of driving the focusing motor 3 between two steps, that is, high speed and low speed, in response to the speed control signal SC from focusing motor control circuit 110 which is based on the output from comparing circuit 67. More specifically, a function of switching the speed of driving the focusing motor 3 in two steps in response to speed control signal SC is added to focusing motor driving circuit 131. When focusing motor 3 is driven at high speed, the amount of change of the focusing lens position per unit time increases when the focusing motor 3 is driven at low speed.

For example, when focusing lens 1 is on the near point side, the direction of initial movement of focusing lens 1 is determined by comparator 9. While lens 1 moves from the near point side to a point P1 near the in-focus point P, the change rate of the focus evaluating value increases, and therefore, an H level speed control signal SC is applied to the focusing motor driving circuit 131. Consequently, focusing motor 3 is driven at high speed, and lens 1 reaches the point P1 quickly.

When focusing lens 1 passes the position P1, the change rate of the focus evaluating value begins to decrease. Consequently, the comparison output from change rate comparing circuit 67 changes from the H level to the L level, and hence the speed control signal SC from the focusing motor control circuit 110 changes from the H level to the L level. As the speed control signal SC attains to the L level, focusing motor driving circuit 131 switches the speed of driving the focusing motor 3 to low speed. Therefore, from the position P1 to the in-focus position P, the amount of change of the lens position per unit time becomes smaller.

Focusing lens 1 passes through in-focus position P and reaches a position P' at which the focus evaluating value decreases from the maximum value by more than the threshold value M. However, since the speed of driving the focusing motor 3 is low, overrun of the focusing lens 1 can be suppressed.

When the focusing lens 1 moves from the infinite side to the in-focus position P, the speed of driving focusing motor 3 is switched from the high speed to the low speed when the focusing lens 1 reaches the position P2.

As described above, in Embodiment 1, since the speed of movement of focusing lens 1 is made lower when the change rate of the focusing evaluating value is decreasing than when the rate of the focusing evaluating value is increasing, focusing lens 1 can be moved quickly to the in-focus position P while overrun of the focusing lens 1 can be suppressed.

Since the change rate of the focus evaluating value is calculated based on the focus evaluating value of a certain field and a field succeeding by two, fluctuation of the focus evaluating value due to interlace scanning does not appear. Therefore, according to Embodiment 1, focusing lens 1 can be accurately and quickly moved to the in-focus position P.

(Embodiment 2)

Figure 3:
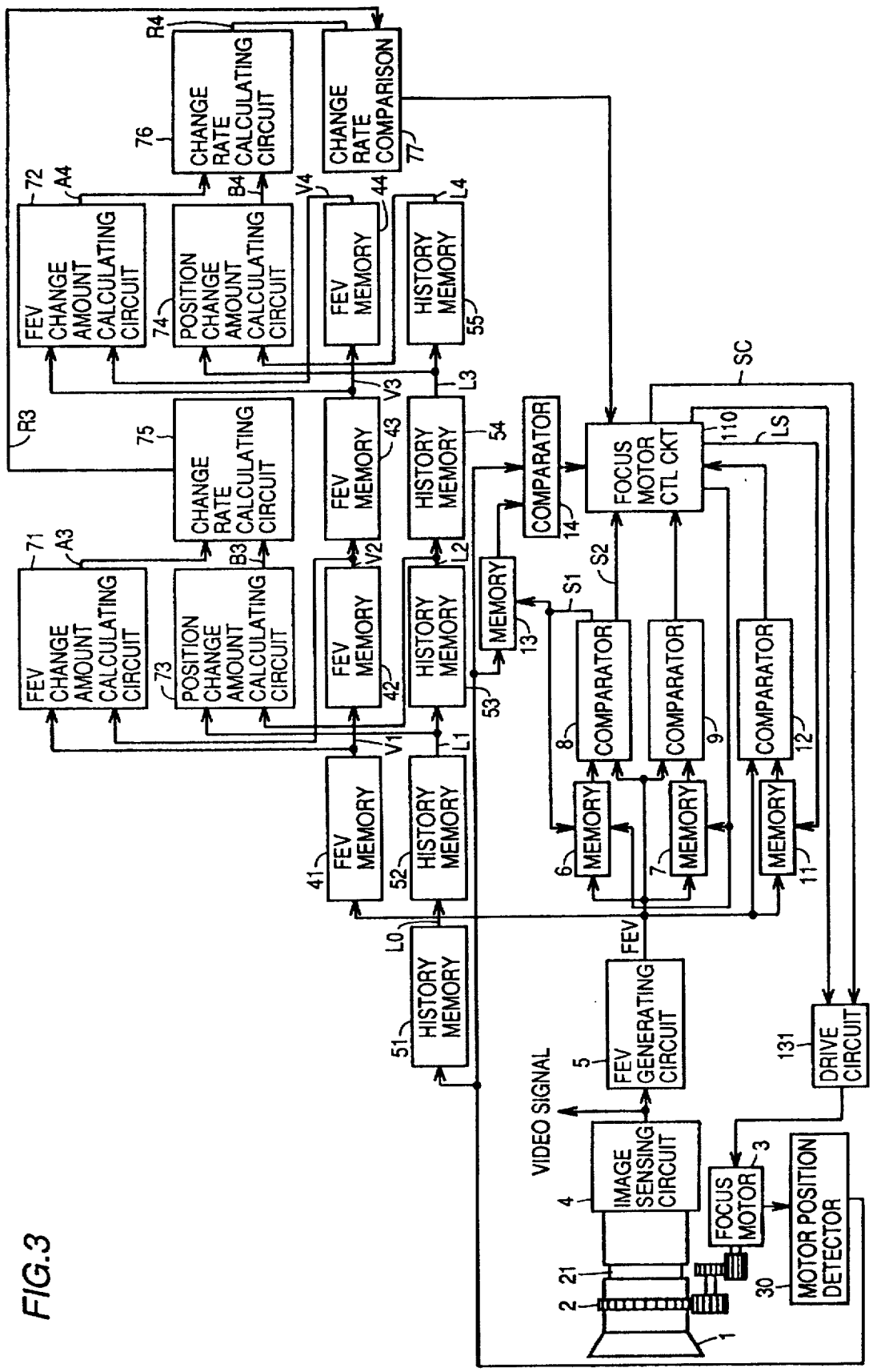
FIG. 3 is a block diagram showing the whole structure of an automatic focusing apparatus in accordance with Embodiment 2 of the present invention.

FIG. 3 is a block diagram showing the whole structure of an automatic focusing apparatus in accordance with Embodiment 2 of the present invention. Embodiment 2 differs from Embodiment 1 above in that the change rate of the focus evaluating value is calculated based on the focus evaluating value of a certain field and the focus evaluating value of the next field, and the driving speed of the focusing motor 3 is changed based on the change rate.

Referring to FIG. 3, the automatic focusing apparatus includes a change amount calculating circuit 71 for calculating an amount of change of the focus evaluating value A3 based on the focus evaluating values V1 and V2 stored in memories 41 and 42, a change amount calculating circuit 73 for calculating an amount of change of the lens position B3 based on lens position data L1 and L2 stored in memories 52 and 53, and a change rate calculating circuit 75 for calculating the change rate of the focus evaluating value based on the amounts A3 and B3 of change from calculating circuits 71 and 73 respectively.

The automatic focusing apparatus further includes a second change amount calculating circuit 72 for calculating an amount of change of the focus evaluating value A4 based on focus evaluating values V3 and V4 stored in memories 43 and 44, a second change amount calculating circuit 74 for calculating an amount of change of lens position B4 based on lens position data L3 and L4 stored in memories 54 and 55, and a second change rate calculating circuit 76 for calculating rate of change of focus evaluating value based on these amounts A4 and B4 of change, from these second calculating circuits 72 and 74 respectively. The automatic focusing apparatus further includes a change rate comparing circuit 77 for comparing the change rates R3 and R4 from change rate calculating circuits 75 and 76.

In Embodiment 2, in calculating circuit 71, the difference V1–V2 of the focus evaluating value V1 of the current field and the focus evaluating value V2 of the preceding field is calculated, and the result is applied as the amount of change A3 of the focus evaluating value to change rate calculating circuit 75. In calculating circuit 73, the absolute value |L1–L2| of the difference between lens position data L1 corresponding to the focus evaluating value V1 and lens position data L2 corresponding to the focus evaluating value V2 is calculated, and the result is applied as the amount of change B3 of the lens position to change rate calculating circuit 75. In change rate calculating circuit 75, the ratio A3/B3 of the amounts of change A3 and B3 from calculating circuits 71 and 73, respectively, is calculated, and the result is applied to change rate comparing circuit 77 as change rate R3 of the focus evaluating value.

In second calculating circuit 72, the difference V3–V4 between the focus evaluating value V3 of the field preceding by two from the current field and the focus evaluating value V4 of the field preceding by three is calculated, and the result is applied as the amount of change A4 of the focus evaluating value to second change rate calculating circuit 76. In second calculating circuit 74, the absolute value |L3–L4| of the difference between lens position data L3 corresponding to the focus evaluating value V3 and lens position data L4 corresponding to focus evaluating value V4 is calculated, and the result is applied as the amount of change B4 of the lens position to second change rate calculating circuit 76. In change rate calculating circuit 76, the ratio A4/B4 of the amounts A4 and B4 of change from second calculating circuits 72 and 74, respectively, is calculated, and the result is applied as the change rate R4 of the focus evaluating value to change rate comparing circuit 77.

When R3≧R4, that is, when the change rate of the focus evaluating value is increasing, change rate comparing circuit 77 controls focusing motor control circuit 110 so that an H level speed control signal SC is generated. In response to the H level speed control signal SC, focusing motor driving circuit 131 drives the focusing motor 3 at high speed. Consequently, the amount of change of the lens position per unit time increases, and focusing lens moves quickly to the in-focus position.

Meanwhile, when R3<R4, that is, when the change rate of the focus evaluating value is decreasing, change rate comparing circuit 77 controls focusing motor control circuit 110 so that an L level speed control signal SC is generated. In response to the L level speed control signal SC, focusing motor driving circuit 131 switches the speed of driving the focusing motor 3 from high speed to low speed. Consequently, the amount of change of the lens position per unit time decreases, and overrun of the lens near the in-focus position can be minimized.

In Embodiment 2, the change rate of the focus evaluating value between the current field and the last field is calculated, the change rate of the focus evaluating value between the second last and the third last fields is calculated, and these two calculated change rates are compared. Since there is time difference of 2 fields between these two change rates R3 and R4, fluctuation of the focus evaluating value of 2 field period caused by interlace scanning can be almost fully removed.

In Embodiments 1 and 2 above, the speed of driving focusing motor 3 cannot be controlled based on the comparison output from change rate comparing circuit 67 until at least 4 fields of time has passed. Therefore, it is preferred that the focusing motor driving circuit 131 is initially set to drive focusing motor 3 at high speed during these initial four fields. Alternatively, focusing motor driving circuit 131 may be initially set so that focusing motor 3 is driven at low speed.

In Embodiments 1 and 2, the speed of rotation of focusing motor 3 is switched in two steps. However, it may be switched in three steps. More specifically, in the vicinity of the near point, infinite point and points P1 and P2 at which change rate of the focus evaluating value hardly changes, (i.e., hardly increases or decreases) focusing motor 3 may be rotated at an intermediate speed. Further, the speed of rotation of the focusing motor 3 may be changed continuously in response to the change rate of the focus evaluating value.

[Embodiment 3]

Figure 4:
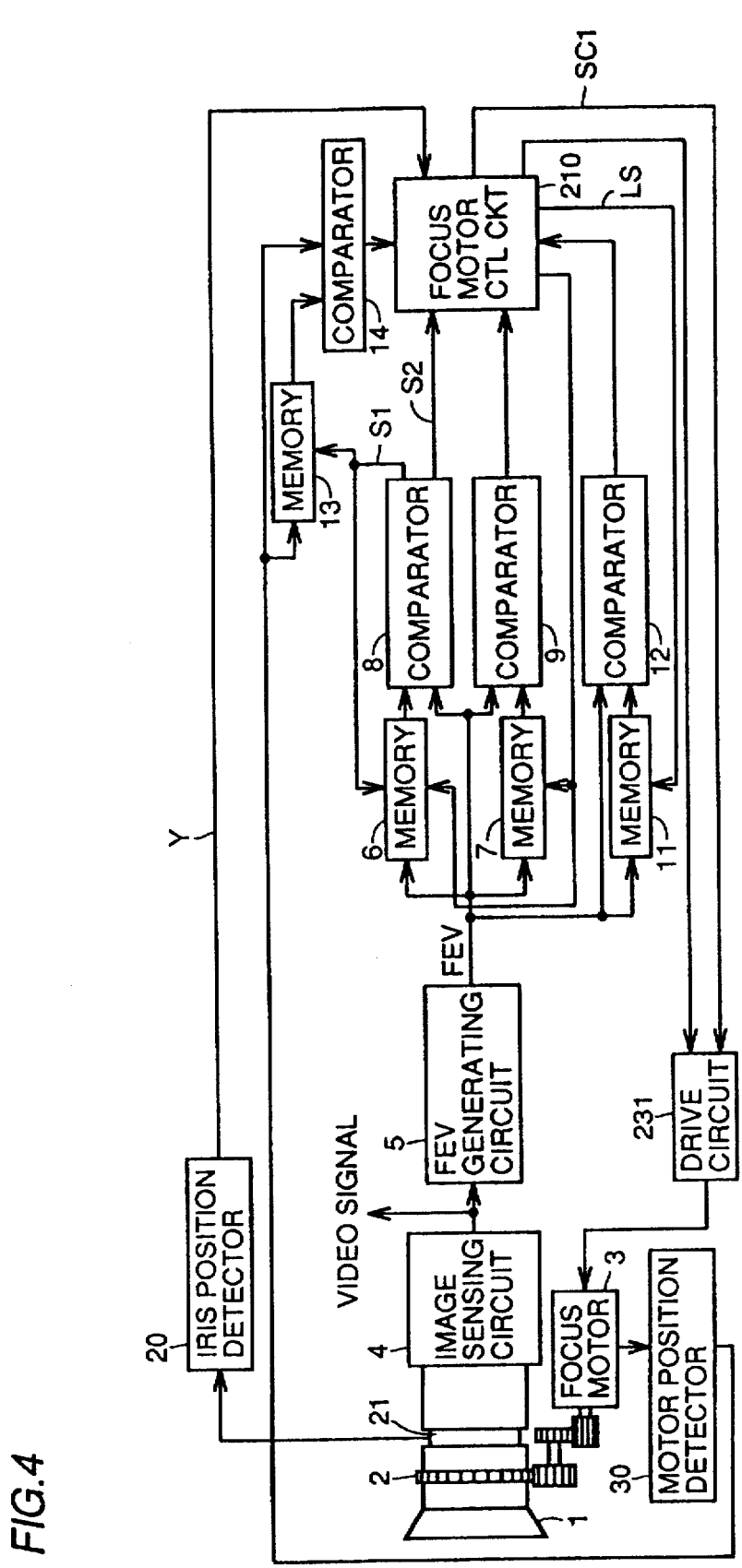
FIG. 4 is a block diagram showing the whole structure of an automatic focusing apparatus in accordance with Embodiment 3 of the present invention.
Figure 5:
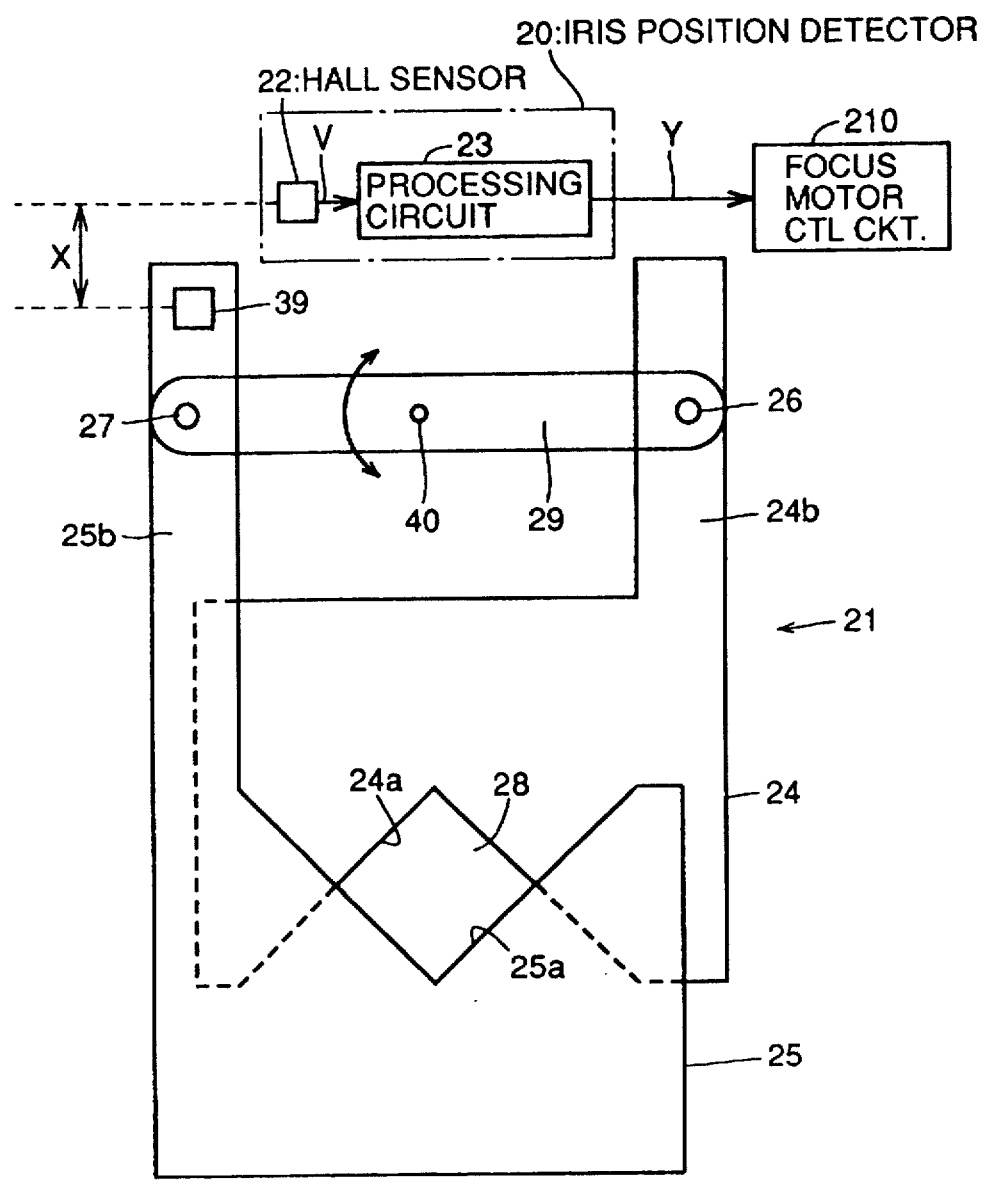
FIG. 5 is an illustration showing details of an iris position detector and an iris mechanism of FIG. 4.

FIG. 4 is a block diagram showing the whole structure of the automatic focusing apparatus in accordance with Embodiment 3 of the present invention. FIG. 5 shows details of the iris mechanism and iris position detector of FIG. 4.

Embodiment 3 differs from Embodiments 1 and 2 above in that an iris position detector 20 is provided and the speed of driving focusing motor 3 is changed continuously in response to the iris position detected by iris position detector 20.

Referring to FIG. 4, iris position detector 20 detects an iris position of a mechanical iris mechanism 21 positioned between focusing lens 1 and an image sensor of image sensing circuit 4. An output Y from iris position detector 20 is applied to a focusing motor control circuit 210. Focusing motor control circuit 210 generates a speed control signal SC1 in response to the output Y from iris position detector 20, and applies the same to focusing motor driving circuit 231. Focusing motor driving circuit 231 controls the speed of driving focusing motor 3 in response to speed control signal SC1.

Referring to FIG. 5, the iris mechanism 21 includes a rotor 29 rotatably supported on a support shaft 40 fixed on a video camera chassis, a movable vane 24 having an arm 24b rotatably supported on one side of rotor 29 by means of a support shaft 26, and a movable vane 25 having an arm 25b rotatably supported on the other side of rotor 29 by a support shaft 27. Movable vane 24 has a V shaped notch 24a at its lower side, while the movable vane 25 has a V shaped notch 25a on its upper side. These movable vanes 24 and 25 are arranged so that notches 24a and 25a overlap with each other, which notches 24a and 25a provide a rectangular iris opening 28. Iris mechanism 21 is positioned in a lens barrel of the video camera such that the opening 28 is positioned on its optical axis. Therefore, the incident light which has passed through focusing lens 1 reaches the image sensor in image sensing circuit 4 through the opening 28.

When rotor 29 rotates in the counterclockwise direction in the figure, movable vane 24 moves upward in parallel while movable vane 25 moves downward in parallel. Consequently, the area of opening 28 is enlarged, and as a result, the iris is less stopped down. When the iris is opened gradually in this manner, the amount of incident light to the image sensor increases.

When rotor 29 is rotated in clockwise direction, movable vane 24 moves downward in parallel and movable vane 25 moves upward in parallel. Consequently, the area of iris opening 28 is decreased, and the iris is stopped down. When the iris is closed gradually in this manner, the amount of incident light to the image sensor is decreased.

Iris value detector 20 includes a Hall sensor 22 utilizing the Hall effect, and a processing circuit 23 for normalizing an output V from Hall sensor 22. A magnet 39 is attached on the arm 25b of movable vane 25. Hall sensor 22 is fixed on a portion of the video camera chassis which is near the magnet 39. When rotor 29 rotates and the iris is changed, distance between Hall sensor 22 and magnet 39 changes, and the output V from Hall sensor 22 changes continuously. The output V of Hall sensor 22 rises continuously as magnet 39 comes closer and the magnetic force becomes stronger.

The output V from Hall sensor 22 is represented by the following equation (1), where X represents the upward and downward component of the distance between Hall sensor 22 and magnet 39, V0 represents the output of Hall sensor 22 when magnet 39 comes closest to Hall sensor 22, that is, when X=0, and "a" represents a constant, as shown in FIG. 5:

$$V = V0 - a \times X \tag{1}$$

The area S of the iris opening 28 is represented by the following equation (2), where b is a constant:

$$S = b \times X^2 \tag{2}$$

The F value F is represented by the equation (3), where c is a constant:

$$F = c/S^{1/2} \tag{3}$$

The field of depth H is represented by the equation (4), where d is a constant:

$$H = dF \tag{4}$$

According to the equations (1) to (4) above, the output V of Hall sensor 22 is represented by the following equation (5), where it is assumed that $A = a \cdot c \cdot d/b^{1/2}$:

$$V = V0 - A/H \tag{5}$$

The output V of Hall sensor 22 is normalized in accordance with the equation (6):

$$A/H = -(V - V0) \tag{6}$$

Specifically, first, V0 is subtracted from the output V of Hall sensor 22, the result is multiplied by −1, and hence A/H is obtained as the normalized output Y of processing circuit 23. Namely, the normalized output Y of processing circuit 23 is in reverse proportion to the depth of field H.

Focusing motor control circuit 210 performs the hill-climbing focusing operation based on the outputs from comparators 8, 9, 12 and 14 as does control circuit 10 of FIG. 6, and in addition, in response to the normalized output Y from iris position detector 20, generates speed control signal SC1 for controlling the speed of driving focusing motor 3.

The speed control signal SC1 is represented by the equation (7) below, where m represents a prescribed offset amount, and n represents a prescribed constant:

$$SC1 = 1/\{n \times (Y - m)\} \tag{7}$$

As is apparent from equation (7), focusing motor control circuit 210 additionally has a function of subtracting a prescribed offset amount m from the normalized output Y, multiplying the result by a prescribed constant n, and providing the inverse of the result of multiplication as the speed control signal SC1.

The constants a, b, c, d, m and n in equations (1) to (7) above are set to optimal values in advance through experiment.

As a result, when the iris mechanism 21 is gradually closed from the full-open state and gradually stopped down, the F value increases gradually and depth of field becomes deeper. At this time, normalized output Y decreases gradually, and accordingly, the level of speed control signal SC1 increases.

Meanwhile, when iris mechanism 21 is opened gradually and the iris is less stopped down, the F value decreases and the depth of field becomes shallower. At this time, the normalized output increases, and the level of the speed control signal SC1 becomes lower.

Similar to driving circuit 31 of FIG. 6, focusing motor driving circuit 231 drives or stops focusing motor 3, or reverses the direction of rotation of focusing motor 3 in response to the output from focusing motor control circuit 210 based on the outputs from comparators 8, 9 and 14, and in addition, changes the speed of driving focusing motor 3 in response to speed control signal SC1 from focusing motor control circuit 210. In other words, a function of changing the speed of driving the focusing motor 3 in proportion to the level of speed control signal SC1 is added to focusing motor driving circuit 231.

Figure 8:
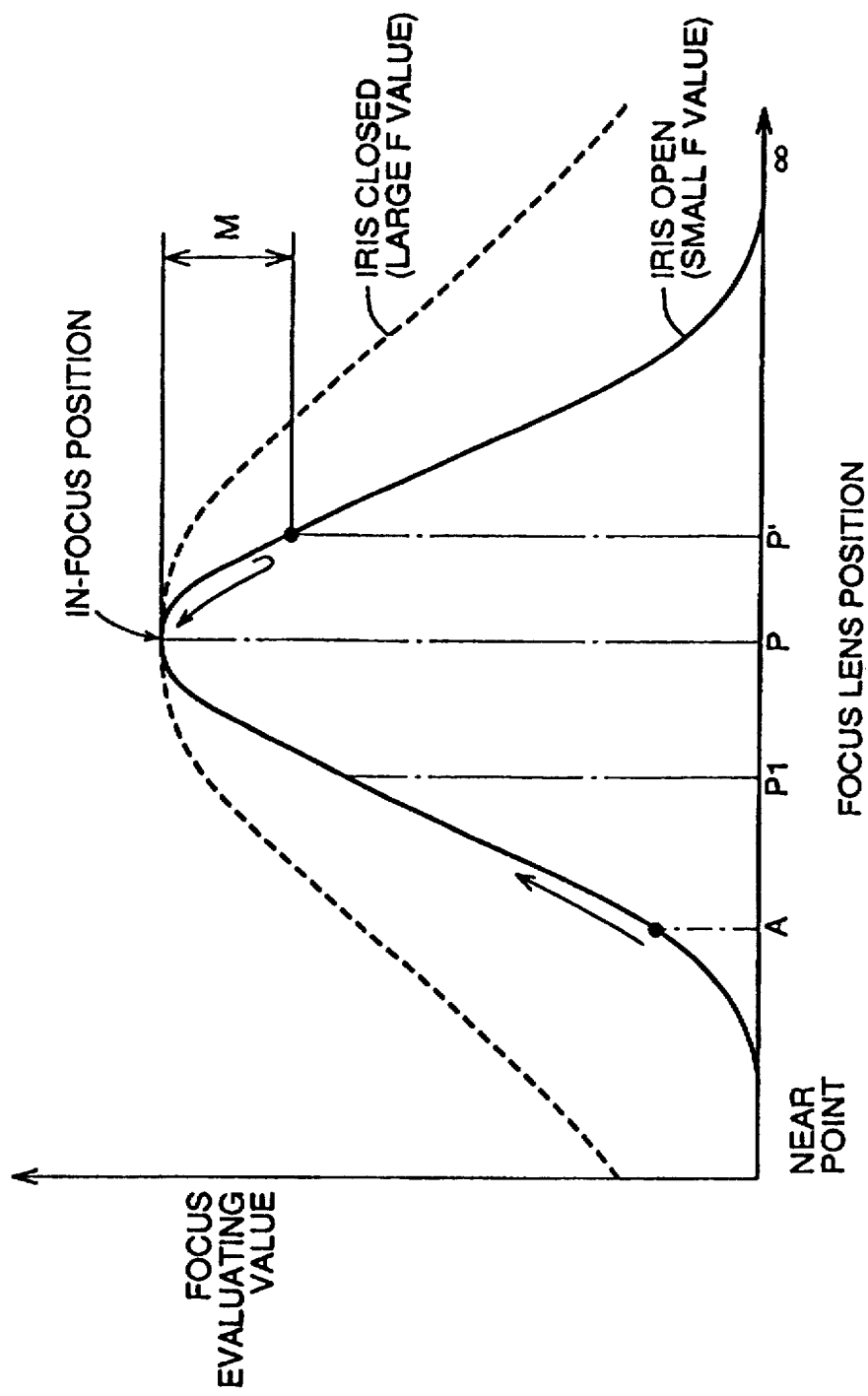
FIG. 8 is a graph showing relation between the focus evaluating value and the position of the focusing lens in the automatic focusing apparatus shown in FIG. 6.

According to Embodiment 3, when the iris is not stopped down much and depth of field is shallow as represented by the solid line in FIG. 8, focusing motor 3 is driven at relatively low speed, and therefore overrun of the focusing lens 1 in the vicinity of the in-focus position P can be minimized.

Meanwhile, if the iris is much stepped down and the depth of field is large as represented by the dotted line in FIG. 8, focusing motor 3 is driven at relatively high speed, and therefore the amount of change of the focus evaluating value per unit time increases. Therefore, erroneous automatic focusing operation derived from change in object can be suppressed.

(Other Embodiments)

In Embodiment 3 above, the speed of driving focusing motor 3 increases continuously as the iris is more stopped down. Alternatively, the speed of driving may be increased stepwise. Further, the Embodiments 1 to 3 may be constituted by a microprocessor. The movement forward and rearward of focusing lens 1 may be implemented by a piezoelectric element instead of a motor. Further, not the focusing lens but the image sensor itself such as the CCD (not shown) may be moved forward or rearward.

In either of the embodiments, the front focus method in which the lens nearest to the object is moved as the focusing lens, or a rear focus method in which the lens nearest to the image sensor is moved as the focusing lens, may be employed. Though the iris mechanism 21 is provided between the focusing lens 1 and an image sensor in the above described embodiments, the iris mechanism may be provided on the object side than the focusing lens 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus for automatically matching focus with respect to an object in response to a video signal of the object obtained from image sensing means having a lens and an image sensor receiving incident light through said lens, comprising:

a focus evaluating value generator for generating a focus evaluating value at every first prescribed period based on a high frequency component level of the video signal obtained from said image sensor;

a lens actuator for changing a position of said lens along an axial direction relative to said image sensor such that the focus evaluating value supplied by said focus evaluating value generator attains a maximum value;

an evaluating value change rate generator for generating an evaluating value change rate based on a ratio of an amount of change of the focus evaluating value in a second prescribed period with respect to an amount of change of position of said lens corresponding thereto; and a speed controller for controlling a speed at which said lens actuator changes position of said lens, based on the evaluating value change rate generated by the evaluating value change rate generator, wherein said speed controller includes
  means for detecting whether the evaluating value change rate generated successively from said evaluating value change rate generator, is increasing or decreasing, and
  means for decreasing the speed of change of said position of said lens by said lens actuator when the means for detecting determines that the evaluating value change rate is decreasing, from the speed of change of said position of said lens by said lens actuator when the evaluating value change rate is increasing, and wherein said focus evaluating value generator includes
  means for integrating the high frequency component level of every field to produce an integration result and
  means for supplying the integration result as the focus evaluating value;

said evaluating value change rate generator includes
  a first storage device for storing focus evaluating values of four successive fields supplied from said focus evaluating value generator, and
  a second storage device for storing four position data of said lens corresponding to the four focus evaluating values stored in said first storage device,
  a first evaluating value change rate generator for generating a first evaluating value change rate, which is a ratio of an amount of change of the focus evaluating values with respect to an amount of change of positions of said lens based on a first and a third of the four focus evaluating values stored in said first storage device and on corresponding first and third of the four position data stored in said second storage device, and
  a second evaluating value change rate generator for generating a second evaluating value change rate, which is a ratio of an amount of change of the focus evaluating values with respect to an amount of change of positions of said lens based on second and fourth of the four focus evaluating values stored in said first storage device and on corresponding second and fourth of the four position data stored in said second storage device;

said means for detecting includes
  means for comparing the first evaluating value change rate from said first evaluating value change rate generator with the second evaluating value change rate from said second evaluating value charge rate generator which indicates that the change rate of the focus evaluating value is increasing when the first evaluating value change rate is smaller than the second evaluating value change rate, and otherwise indicating that the change rate of the focus evaluating value is decreasing.

2. An automatic focusing apparatus for automatically matching focus with respect to an object in response to a video signal of the object obtained from image sensing means having a lens and an image sensor receiving incident light through said lens, comprising:

a focus evaluating value generator for generating a focus evaluating value at every first prescribed period based on a high frequency component level of the video signal obtained from said image sensor;

a lens actuator for changing a position of said lens along an axial direction relative to said image sensor such that the focus evaluating value supplied by said focus evaluating value generator attains a maximum value;

an evaluating value change rate generator for generating an evaluating value change rate based on a ratio of an amount of change of the focus evaluating value in a second prescribed period with respect to an amount of change of position of said lens corresponding thereto; and a speed controller for controlling a speed at which said lens actuator changes position of said lens, based on the evaluating value change rate generated by the evaluating value change rate generator, wherein said speed controller includes
means for detecting whether the evaluating value change rate generated successively from said evaluating value change rate generator, is increasing or decreasing, and
means for decreasing the speed of change of said position of said lens by said lens actuator when the means for detecting determines that the evaluating value change rate is decreasing, from the speed of change of said position of said lens by said lens actuator when the evaluating value change rate is increasing, and wherein said focus evaluating value generator integrates the high frequency component every field to produce focus evaluating values;

said evaluating value change rate generator includes
a first storage device for successively storing a focus evaluating value of each field successively supplied from said focus evaluating value supplying means,
a second storage device for storing, instead of said first storage device, the focus evaluating value which has been stored in said first storage device, when said focus evaluating value generator supplies a focus evaluating value of a next field,
a third storage device for storing, instead of said second storage device, the focus evaluating value which has been stored in said second storage device, when said focus evaluating value generator supplies a focus evaluating value of a next field,
a fourth storage device for storing, instead of said third storage device, the focus evaluating value which has been stored in said third storage device, when said focus evaluating value generator supplies a focus evaluating value of a next field,
a fifth storage device for storing position data of said lens corresponding to the focus evaluating value stored in said first storage device,
a sixth storage device for storing, instead of said fifth storage device, the position data which has been stored in said fifth storage device, when said focus evaluating value generator supplies a focus evaluating value of a next field,
a seventh storage device for storing, instead of said sixth storage device, the position data which has been stored in said sixth storage device, when said focus evaluating value generator supplies a focus evaluating value of a next field,
an eighth storage device for storing, instead of said seventh storage device, the position data which has been stored in said seventh storage device, when said focus evaluating value generator supplies a focus evaluating value of a next field, a first evaluating value change amount generator for generating a first evaluating value change amount based on a difference between the focus evaluating value stored in said second storage device and the focus evaluating value stored in said fourth storage device, a first position change amount generator for generating a first position change amount based on a difference between the position data stored in said sixth storage device and the position data stored in said eighth storage device, a first evaluating value change rate generator for generating a first evaluating value change rate based on a ratio of the first evaluating value change amount generated by said first evaluating value change amount generator with respect to the first position change amount generated by the first position change amount generator, a second evaluating value change amount generator for generating a second evaluating value change amount based on a difference between the focus evaluating value stored in said first storage device and the focus evaluating value stored in said third storage device, a second position change amount generator for generating a second position change amount based on a difference between the position data stored in said fifth storage device and the position data stored in said seventh storage device, and a second evaluating value change rate generator for generating a second evaluating value change rate based on a ratio of said second evaluating value change amount generated by said second evaluating value change amount generator with respect to the second position change amount generated by said second position change amount generator; and said means for detecting means includes
means for comparing the first evaluating value change rate generated by said first evaluating value change rate generator with the second evaluating value change rate generated by said second evaluating value change rate generator and
means for indicating that the change rate of the focus evaluating value is increasing when the first evaluating value change rate is smaller than the second evaluating value change rate, and otherwise indicating that the change rate of the focus evaluating value is decreasing.

3. An automatic focusing apparatus for automatically matching focus with respect to an object in response to a video signal of the object obtained from image sensing means having a lens and an image sensor receiving incident light through said lens, comprising:

a focus evaluating value generator for generating a focus evaluating value at every first prescribed period based on a high frequency component level of the video signal obtained from said image sensor;

a lens actuator for changing a position of said lens along an axial direction relative to said image sensor such that the focus evaluating value supplied by said focus evaluating value generator attains a maximum value;

an evaluating value change rate generator for generating an evaluating value change rate based on a ratio of an amount of change of the focus evaluating value in a second prescribed period with respect to an amount of change of position of said lens corresponding thereto; and a speed controller for controlling a speed at which said lens actuator changes position of said lens, based on the evaluating value change rate generated by the evaluating value change rate generator, wherein said speed controller includes means for detecting whether the evaluating value change rate generated successively from said evaluating value change rate generator, is increasing or decreasing, and means for decreasing the speed of change of said position of said lens by said lens actuator when the means for detecting determines that the evaluating value change rate is decreasing, from the speed of change of said position of said lens by said lens actuator when the evaluating value change rate is increasing, and wherein said focus evaluating value generator integrates the high frequency component level every field to generate a focus evaluating value;

said evaluating value change rate generator includes a first storage device for storing focus evaluating values of four consecutive fields generated by said focus evaluating value generator, a second storage device for storing four position data of said lens corresponding to the four focus evaluating values stored in said first storage device, a first change rate generator for generating a first evaluating value change rate, which is a ratio of an amount of change of the focus evaluating values with respect to an amount of change of these positions based on preceding two of the four focus evaluating values stored in said first storage device and corresponding preceding two of the four position data stored in said second storage device, and a second change rate generator for generating a second evaluating value change rate which is a ratio of an amount of change of the focus evaluating values with respect to an amount of change of these positions based on succeeding two of the four focus evaluating values stored in said first storage device and corresponding succeeding two of the four position data stored in said second storage device; and said means for detecting includes means for comparing the first evaluating value change rate from said first change rate generator with the second evaluating value change rate from said second change rate generator and means for indicating that the change rate of the focus evaluating value is increasing when the first evaluating value change rate is smaller than the second evaluating value change rate, and otherwise indicating that the change rate of the focus evaluating value is decreasing.

4. An automatic focusing apparatus for automatically matching focus with respect to an object in response to a video signal of the object obtained from image sensing means having a lens and an image sensor receiving incident light through said lens, comprising:

a focus evaluating value generator for generating a focus evaluating value at every first prescribed period based on a high frequency component level of the video signal obtained from said image sensor;

a lens actuator for changing a position of said lens along an axial direction relative to said image sensor such that the focus evaluating value supplied by said focus evaluating value generator attains a maximum value;

an evaluating value change rate generator for generating an evaluating value change rate based on a ratio of an amount of change of the focus evaluating value in a second prescribed period with respect to an amount of change of position of said lens corresponding thereto; and a speed controller for controlling a speed at which said lens actuator changes Position of said lens, based on the evaluating value change rate generated by the evaluating value change rate generator, wherein said speed controller includes means for detecting whether the evaluating value change rate generated successively from said evaluating value change rate generator, is increasing or decreasing, and means for decreasing the speed of change of said position of said lens by said lens actuator when the means for detecting determines that the evaluating value change rate is decreasing, from the speed of change of said position of said lens by said lens actuator when the evaluating value change rate is increasing, and wherein said focus evaluating value generator integrates the high frequency component level of every field to generate a focus evaluating value;

said evaluating value change rate generator includes a first storage device for successively storing a focus evaluating value of each field generated successively by said focus evaluating value generator, a second storage device for storing, instead of said first storage device, the focus evaluating value which has been stored in said first storage device, when said focus evaluating value generator supplies a focus evaluating value of a next field, a third storage device for storing, instead of said second storage device, the focus evaluating value which has been stored in said second storage device, when said focus evaluating value generator supplies a focus evaluating value of a next field, a fourth storage device for storing, instead of said third storage device, the focus evaluating value which has been stored in said third evaluating device, when said focus evaluating value generator supplies a focus evaluating value of a next field, a fifth storage device for storing position data of said lens corresponding to the focus evaluating value stored in said first storage device, a sixth storage device for storing, instead of said fifth storage device, the position data which has been stored in said fifth storage device, when said focus evaluating value generator supplies a focus evaluating value of a next field, a seventh storage device for storing, instead of said sixth storage device, the position data which has been stored in said sixth storage device, when said focus evaluating value generator supplies a focus evaluating value of a next field, an eighth storage device for storing, instead of said seventh storage device, the position data which has been stored in said seventh storage device, when said focus evaluating value generator supplies a focus evaluating value of a next field, a first evaluating value change amount generator for generating a first evaluating value change amount based on a difference between the focus evaluating value stored in said fourth storage device and the focus evaluating value stored in said third storage device, a first position change amount generator for generating a first position change amount based on a difference between position data stored in said eighth storage device and position data stored in said seventh storage device, a first evaluating value change rate generator for generating a first evaluating value change rate which is a ratio of said first evaluating value change amount generated by said first evaluating value change amount generator with respect to the first position change amount generated by said first position change amount generator, a second evaluating value change amount generator for generating a second evaluating value change amount based on a difference between the focus evaluating value stored in said second storage device and the focus evaluating value stored in said first storage device, a second position change amount generator for generating a second position change amount based on a difference between the position data stored in said sixth storage device and the position data stored in said fifth storage device, and a second evaluating value change rate generator for generating a second evaluating value change rate, which is a ratio of the second evaluating value change amount generated by said second evaluating value change amount generator with respect to the second position change amount generated by said second position change amount generator; and said means for detecting includes means for comparing the first evaluating value change rate generated by said first evaluating value change rate generator with the second evaluating value change rate generated by said second evaluation change rate generator and means for indicating that the change rate of the focus evaluating value is increasing when the first evaluating value change rate is smaller than the second evaluating value change rate, and otherwise indicating that the change rate of the focus evaluating value is decreasing.

* * * * *